United States Patent
Luig et al.

(10) Patent No.: US 6,938,827 B2
(45) Date of Patent: Sep. 6, 2005

(54) MIXER VALVE

(75) Inventors: Frank-Thomas Luig, Menden (DE); Kai Huck, Wetter (DE)

(73) Assignee: Rohe Water Technology AG & Co. KG, Hemer (DE)

( * ) Notice: Subject to any disclaimer, the term of this patent is extended or adjusted under 35 U.S.C. 154(b) by 0 days.

(21) Appl. No.: 10/487,660

(22) PCT Filed: Jun. 12, 2003

(86) PCT No.: PCT/EP03/06150
§ 371 (c)(1),
(2), (4) Date: Feb. 23, 2004

(87) PCT Pub. No.: WO04/001517
PCT Pub. Date: Dec. 31, 2003

(65) Prior Publication Data
US 2004/0238650 A1 Dec. 2, 2004

(30) Foreign Application Priority Data
Jun. 24, 2002 (DE) .......................... 102 28 212

(51) Int. Cl.[7] .............................................. G05D 23/13
(52) U.S. Cl. ................. 236/12.12; 236/12.18; 236/12.2; 137/625.4
(58) Field of Search .................. 236/12.1, 12.11, 236/12.12, 12.16, 12.18, 12.2; 137/625.4

(56) References Cited
U.S. PATENT DOCUMENTS 4,029,256 A   6/1977   Dauga
4,738,393 A * 4/1988   Bergmann et al. ....... 236/12.16
4,767,052 A   8/1988   Kostorz et al.
5,535,943 A * 7/1996   Kahle et al. ............... 236/12.2
6,585,167 B2 * 7/2003  Wolber et al. ............. 236/12.2

FOREIGN PATENT DOCUMENTS

EP    0 448 315    9/1991
EP    0 242 680    7/1993

* cited by examiner

*Primary Examiner*—Marc Norman
(74) *Attorney, Agent, or Firm*—Herbert Dubno

(57) ABSTRACT

In a mixing valve for cold and hot water with thermostatic control of the mixed-water temperature by a thermostat (4) that is connected with a tubular double valve slide (3a, 3b) that is positioned by a temperature selector (5) and that is held in a housing (1) having at least one cold-water inlet (10), one hot-water inlet (11), and one mixed-water outlet (12), the inlet ports (22 and 23) of the mixing valve of the double valve slide (31, 3b) being oppositely controlled at opposite ends, it is suggested that the double valve slide (3a, 3b) have an annular web (31, 31a, 30b) formed with a smaller-diameter partition sleeve (31) that is axially shiftable at least at its end in a bore (24, 26) and that downstream of the inlet ports (22 and 23) the hot water and cold water each flow through respective passages (301) opening into an annular mixing compartment (302) in the web (30, 30a, 30b), the mixing compartment (302) extending radially through the partition sleeve (31) such that exiting mixed water is directed toward the thermostat (4).

15 Claims, 5 Drawing Sheets

MIXER VALVE

The invention relates to a mixing valve for cold and hot water with thermostatic control of the mixed-water temperature by a thermostat that is connected with a tubular double valve slide that is positioned by a temperature selector and that is held in a housing having at least one cold-water inlet, one hot-water inlet, and one mixed-water outlet, the inlet ports of the mixing valve of the double valve slide being oppositely controlled at opposite ends.

A mixing valve of this type is known from EP 0,242,680. In this known mixing valve it is possible under certain circumstances for there to be an incorrect mixing of cold and hot water upstream of and in the region of the thermostat. In this case the thermostat will detect an incorrect temperature so that its control accuracy can suffer.

An improvement in control accuracy is known from German 2,548,650 where a cylindrical guide and deflecting sleeve are provided in the housing in the sensing zone of the thermostat. This device only deflects the hot-water stream in order to prevent it from impinging too early on the temperature-sensing zone.

It is an object of the invention to improve the mixing valve described in the introductory clause of claim 1.

This object is achieved in that the double valve slide has an annular web formed with a smaller-diameter partition sleeve that is axially shiftable at least at its end in a bore and that downstream of the inlet ports the hot water and cold water each flow through respective passages opening into an annular mixing compartment in the web, the mixing compartment extending radially through the partition sleeve such that exiting mixed water is directed toward the thermostat.

Further details of the invention are given in dependent claims 2 through 15.

With the system of this invention the combined hot and cold water, that is the mixed water, flow directly and smoothly over the thermostat, the mixing taking place inside the mixing compartment in the double valve slide. The position of the mixing compartment relative to the temperature-sensitive part of the thermostat is the same according to the invention even when reset or on axial shifting of the double valve slide. Preferably the mixing compartment in the web of the double valve slide is arranged perpendicular or at an angle to the center axis of the double valve slide.

In a further embodiment of the invention preferably downstream of each of the inlet ports for cold and hot water there is a respective annular compartment at the web, passages of the web are at the annular compartments. In order to conduct water there are deflecting lips on the head piece and on the cover.

The passages in the web are directed parallel the center axis of the double valve slide, the passages for cold water and the passages for hot water being relatively offset or coaxial.

In a further embodiment of the invention the double valve slide is unitarily formed with the web and the partition sleeve is of one piece. Preferably for a cost-efficient manufacture it is however preferably to make them of two parts. To this end the double slide valve is preferably formed unitarily with one half of the web and a first part of the partition sleeve while a second part of the partition sleeve is unitarily formed with the other half of the web and is connected at the web with the first half.

Embodiments of the invention are shown in the drawing and are more closely described in the following. In the drawing.

Figure 1:
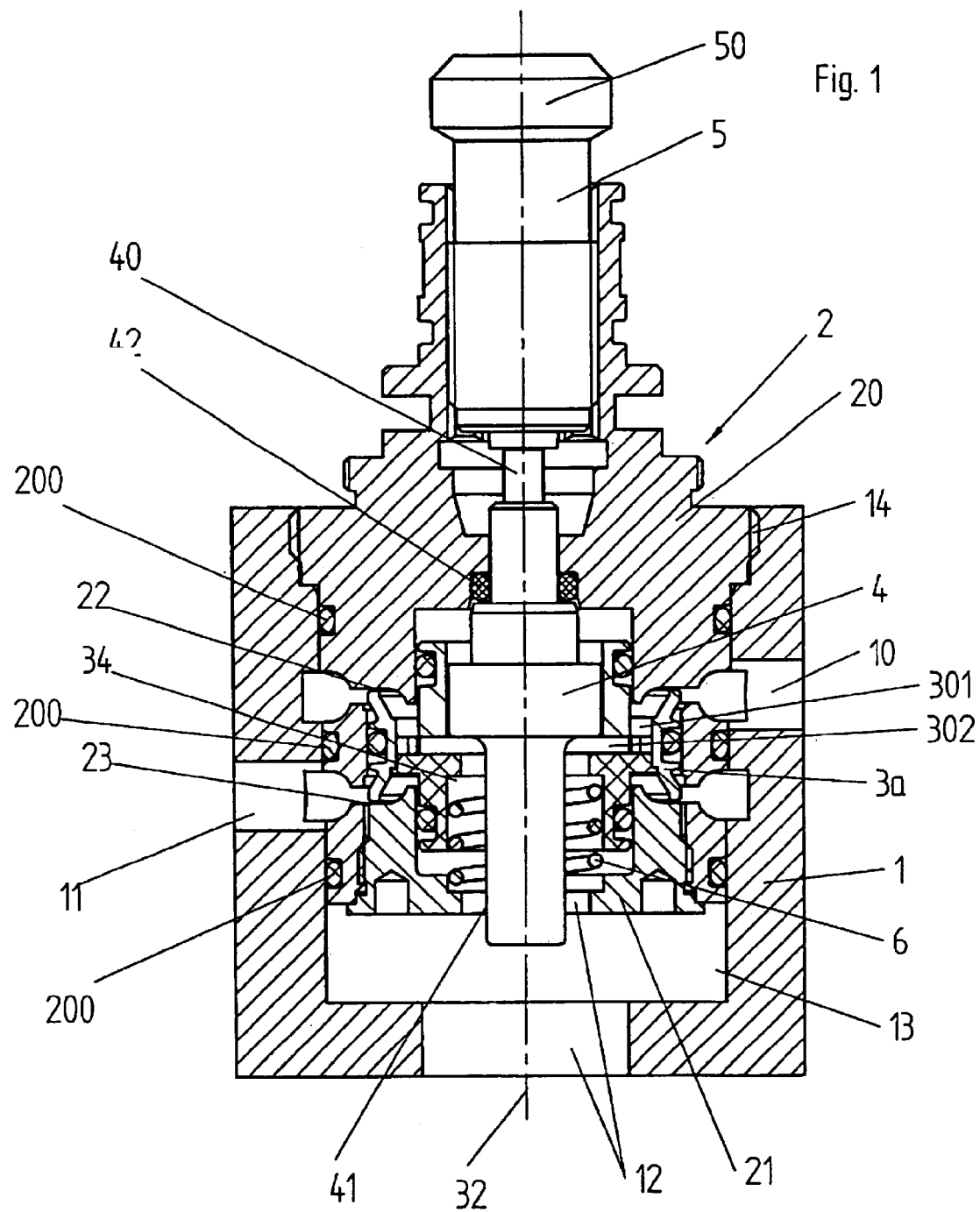
FIG. 1 shows a mixing valve with thermostatic control in a schematic longitudinal section.
Figure 2:
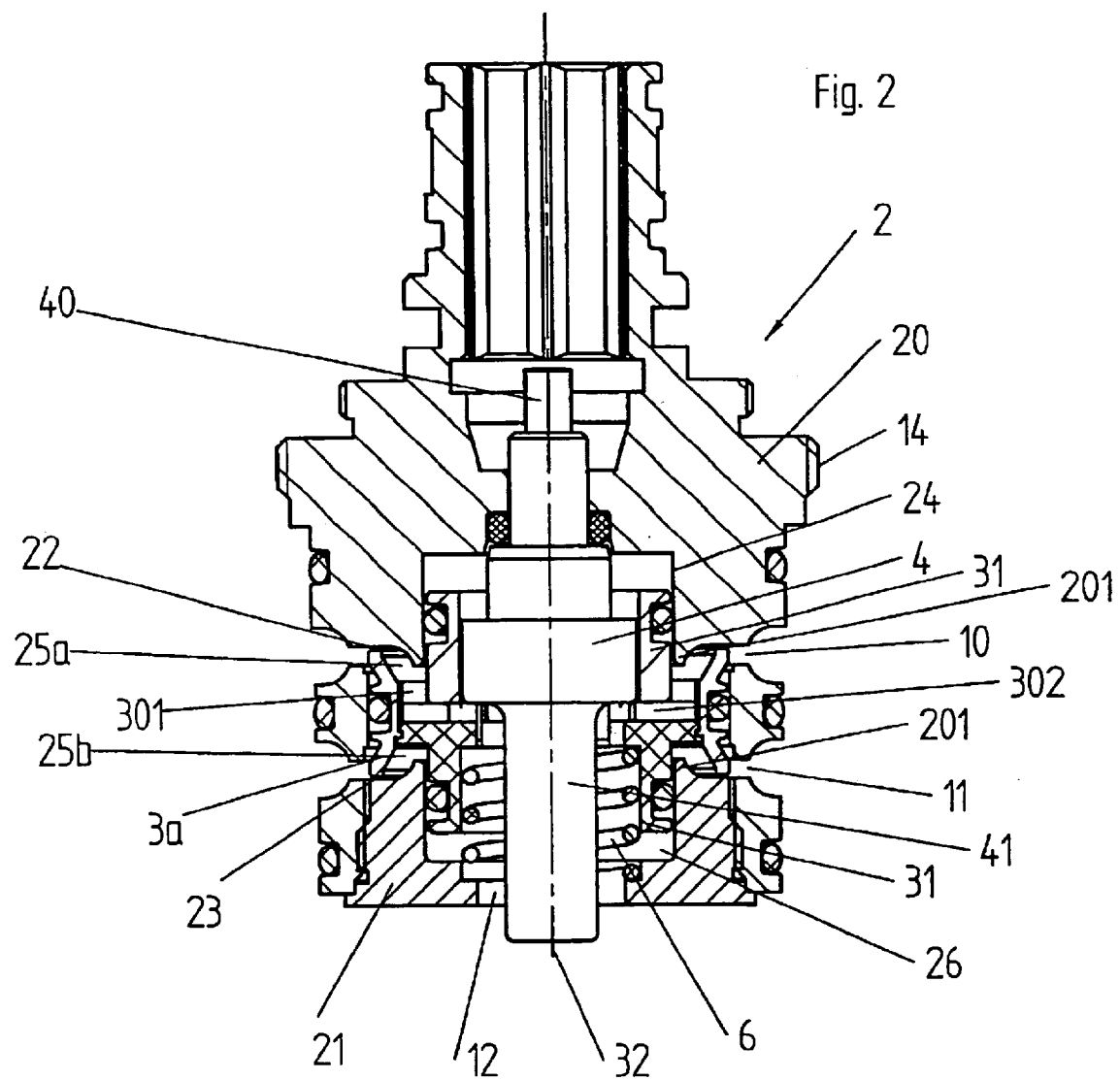
FIG. 2 shows the valve insert of FIG. 1 with a double valve slide and thermostat as a subassembly.

For simplicity's sake the same or equivalent elements shown in the illustrated embodiments are provided with the same reference numerals. The thermostatically controlled mixing valve shown schematically in the drawing in FIG. 1 is comprised of a housing 1 having a bore 13 holding a valve insert 2. The valve insert 2 is comprised of a cup-shaped head piece 20 and a cover 21 forming a single unit. A double valve slide 3a is limitedly axially movable in the valve insert 2. A thermostat 4 coaxial with the double valve slide 3a bears axially at its end on three symmetrically arranged guide and support noses 33 of the double valve slide 3a. A return spring 6 is braced at one end on an end face of the cover 21 and at the other end on a shoulder 34 of the double valve slide 3a so that the double valve slide 3a presses the thermostat 4 toward the head piece 20. The thermostat 4 extends from the head piece 20 through a seal ring 42 and bears on a temperature selector 5 via a control rod 40 whose axial position is a function of the mixed-water temperature. The temperature selector 5 is nonrotatable and axially limitedly shiftable in the head piece 2, having on its outer end an actuating thread 50. The actuating thread 50 engages an unillustrated internally threaded knob fixed axially on the head piece 20 so that rotation of the knob shifts the temperature selector 5 axially in the head piece 20. This axial movement is transmitted by the control rod 40 to the thermostat 4 and to the double valve slide 31 so as to set the desired temperature of the mixed water.

Figure 3:
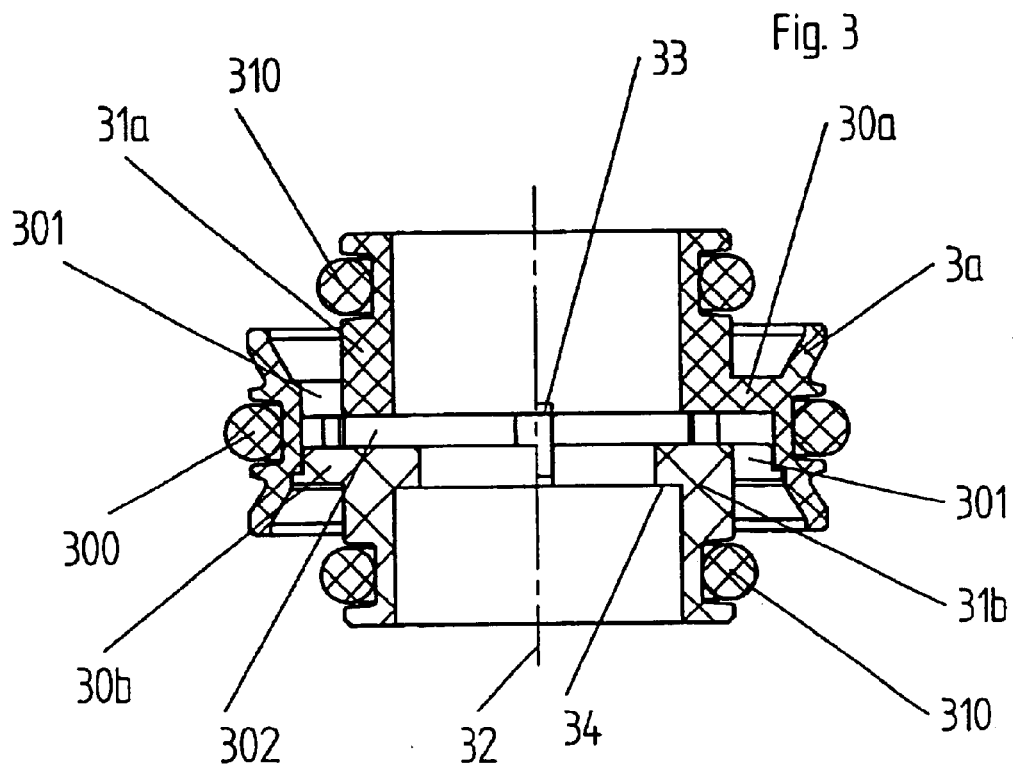
FIG. 3 shows the double valve slide of FIG. 2 in larger scale in longitudinal section along plane III of FIG. 4.

The double valve slide 3a as in particular shown in FIG. 3 of the drawing is formed as two pieces. The double valve slide 3a thus has a web 30a and, unitarily formed therewith, a first part 31a of a partition sleeve 31. A web 30b unitary with a second part 31b of the separating partition sleeve 31 is press fitted to an inner wall of the double valve slide 3a. To this end the part 31b has the guide and abutment noses 33 so that there is a space forming a mixing compartment 302 between the ends of the parts 30a and 31a on one side and 30b and 31b on the other. Instead of the press fit it is possible to use another permanent or releasable connection.

Figure 4:
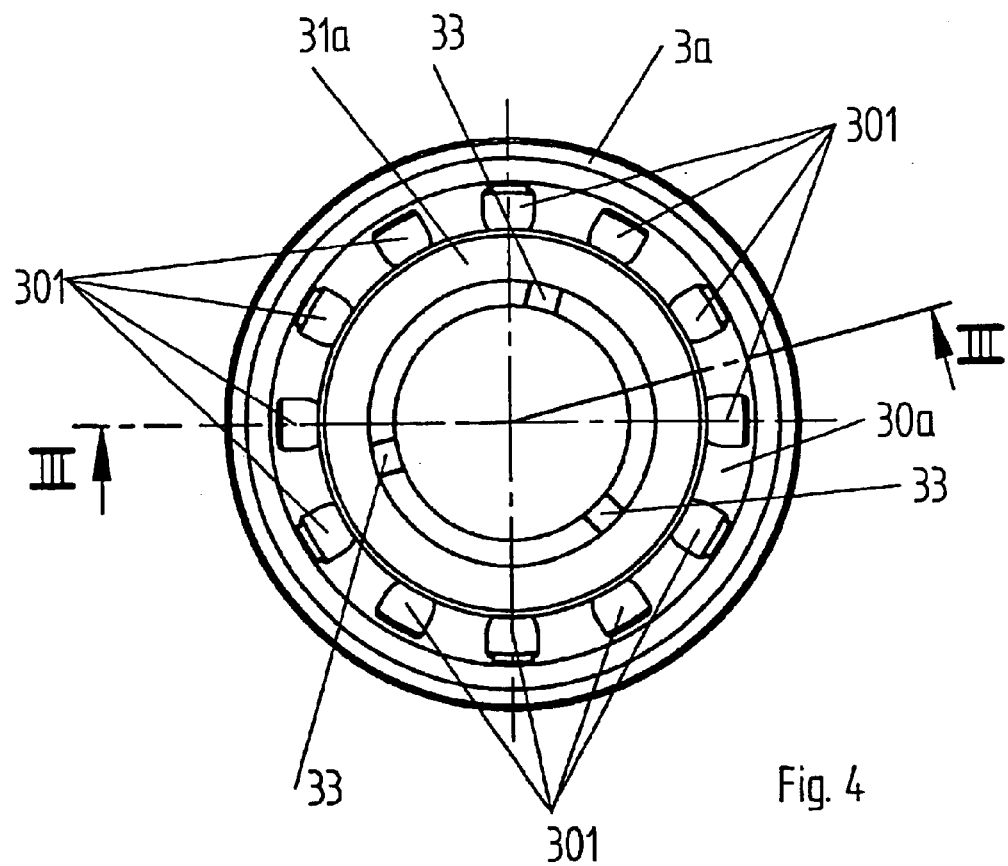
FIG. 4 shows the FIG. 3 double valve slide in top view.

The webs 30a and 30b are formed with passages 301 shaped as symmetrically arranged elongated slots as shown in particular in FIGS. 3 and 4. The inlet passages 301 for hot water are offset from the inlet passages 301 for cold water. Alternatively, the hot- and cold-water passages can be coaxial so that the incoming hot- and cold-water streams frontally impinge against each other. In order to separate the incoming hot water from the incoming cold water an outer surface of the double valve slide 3a carries an O-ring 300 and end regions of the separating partition sleeve 31 carry respective O-rings 310 that bear sealingly against inner surfaces of the head piece 20 and the cover 21.

The housing 1 is formed with a cold-water inlet 10 and a hot-water inlet 11, the hot-water inlet 11 communicating via an annular chamber with an inlet port 23 and the cold-water inlet 10 via an annular chamber with an inlet port 22 of the mixing valve. In order to seal the annular chambers for the hot and cold water, the outside surface of the valve insert 2 has three spaced O-rings 200 that seal against the bore 13 of the housing 1. The valve insert 2 is secured at a screwthread 14 in the housing 1 when installed. Between the cold-water inlet port 22 and the headpiece 20 is a lip 201 for deflecting water into an annular compartment 25*a*, and similarly between the hot-water inlet port 23 and the cover 21 is a lip 201 for diverting water into an annular compartment 25*b*. The thermostat 4 is centered on an axis 32 and is provided downstream of the mixing compartment 302 with a temperature-sensing part 41 that extends right to a mixed-water outlet 12 in the cover 21 and housing 1. The double valve slide 3*a* and the first part 31*a* of the partition sleeve 31 are limitedly axially movable in a stepped bore 24 of the headpiece 20. The second part 31*b* of the partition sleeve 31 is limitedly shiftable in a coaxial bore 26 of the cover 21.

The above-described mixing valve operates as follows:

The desired mixed-water temperature is set by the temperature selector 5 by axially shifting the thermostat 4 and the double-valve slide 3*a* coupled to it into the axial position necessary to create the required flow cross sections of the ports 22 and 23. The cold water coming in at the cold-water inlet 10 thus enters the inlet port 22 and is thence deflected by the lip 201 into the annular compartment 25*a*. It then moves parallel to the center axis 32 through the passages 301 and then is deflected through a right angle by the annular mixing compartment 302. Parallel to this the hot water coming in at the hot-water inlet 11 enters the inlet port 23 and is thence deflected by the lip 201 into the annular compartment 25*b*. The hot water then also moves parallel to the center axis 32 through the passages 301 into the mixing compartment 302 and there is deflected and mixed with the cold water. The mixed water formed in the mixing compartment 302 flows radially to the center axis 32 and then downstream over the temperature-sensing part 41 of the thermostat so that it is possible to very accurately detect the temperature of the mixed water as it leaves the mixed-water outlet 12. Alternatively the mixing canal can be tapered to the center axis so that the exiting mixed valve takes the shape of a frustocone.

Changes in the mixed-water temperature are sensed by the temperature-sensing part 41. A temperature-sensitive body in the thermostat will change size and appropriately axially shift the control rod 40 to correspondingly axially shift the double valve slide 31. The flow cross sections of the inlet ports 22 and 23 for hot and cold water are complementarily changed so that the actual temperature of the mixed water returns to the desired temperature.

Figure 5:
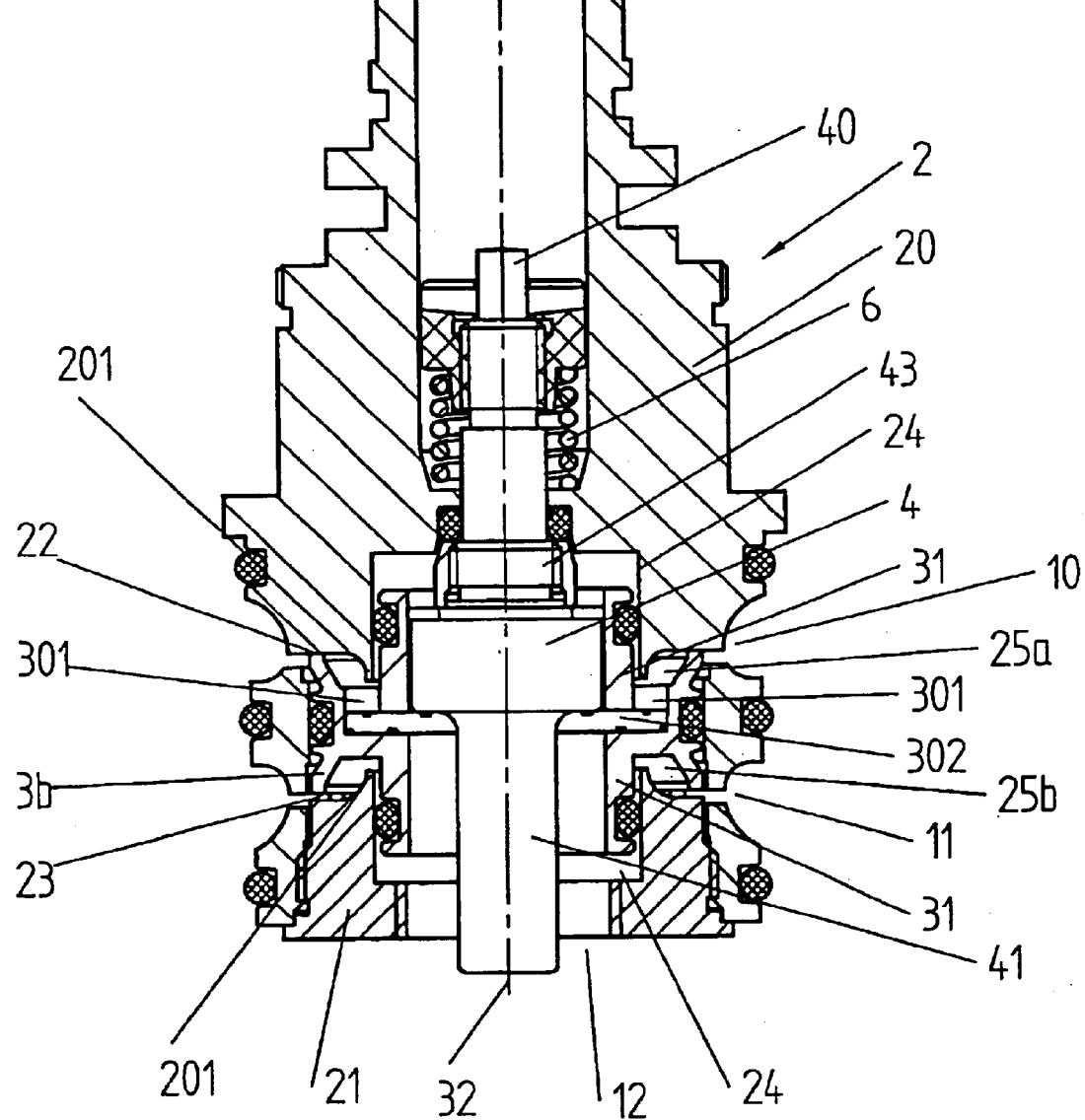
FIG. 5 shows in longitudinal section another valve insert that is usable in a valve housing.
Figure 6:
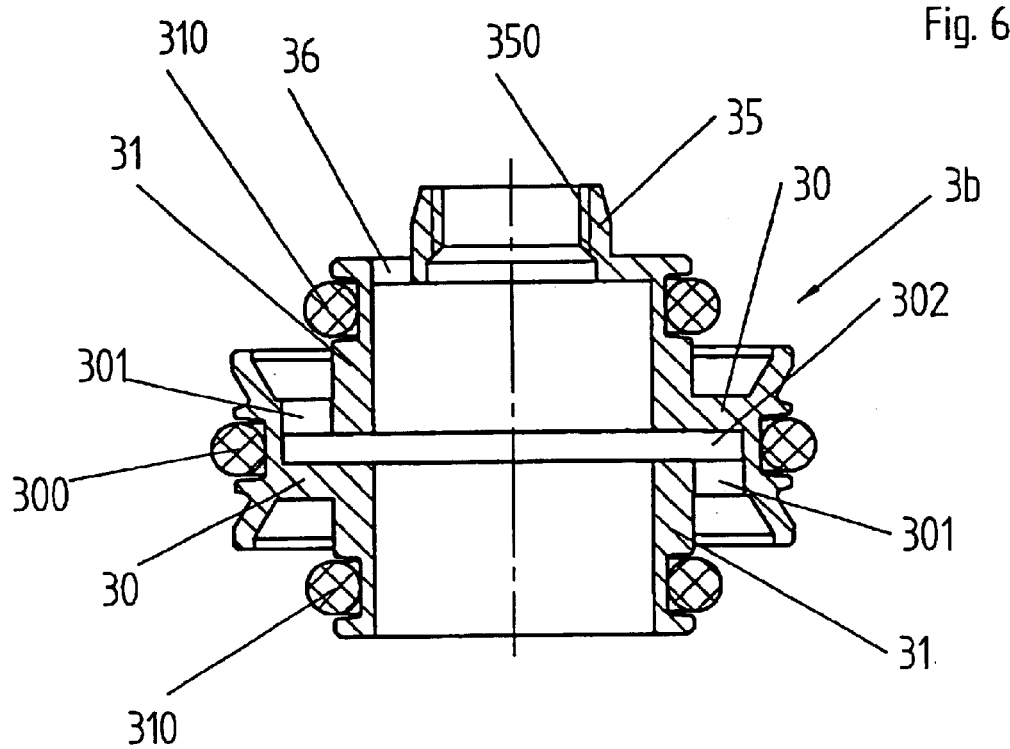
FIG. 6 shows the FIG. 5 double valve slide in large scale in longitudinal section along plane VI of FIG. 7.
Figure 7:
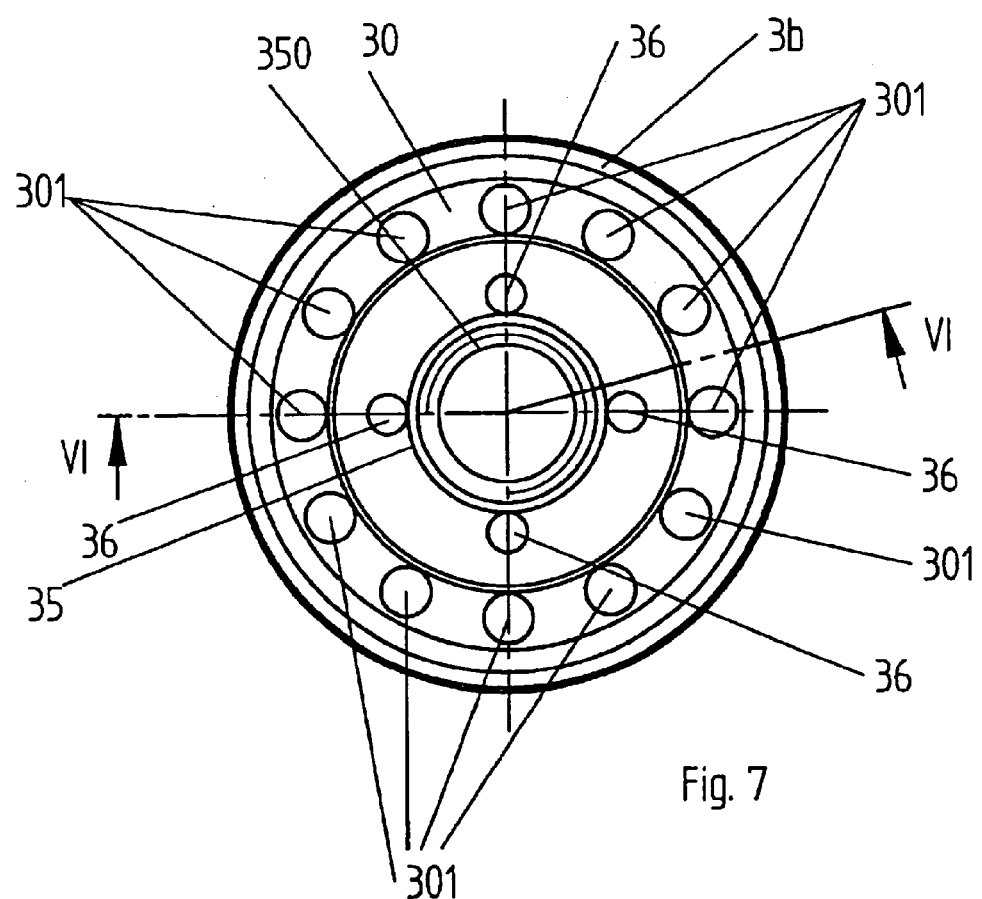
FIG. 7 shows the FIG. 6 double valve slide in top view.

FIG. 5 shows a different valve insert 2 that is also mountable in a housing (not illustrated in the drawing). This valve insert 2 is different from that of the above-described embodiment in that the return spring 6 is not in a water-filled space and the double valve slide 3*b* is unitarily formed at the web with the partition sleeve 31. In addition the double valve slide 3*b* is provided with a diameter-reducing tubular extension 35 having an internal screwthread 350. The thermostat 4 has a complementary outer screwthread 43 threaded into the screwthread 350 of the double valve slide to integrally interconnect them. In addition in the region of the restriction on the tubular extension 35 there are end pressure-relief holes 36. Otherwise this valve inert is the same as the previously described embodiment.

Of course in this embodiment it is also possible to make the double valve slide of two parts at the webs.

What is claimed is:

1. A mixing valve comprising:
    a housing having an axially extending bore and formed with a hot-water inlet port, a cold-water inlet port axially offset therefrom, and a mixed-water outlet port all opening into the bore;
    a tubular valve slide axially shiftable in the bore between one end position blocking the hot-water inlet port and unblocking the cold-water inlet port, an opposite end position blocking the cold-water inlet port and unblocking the hot-water inlet port, and through intermediate positions partially blocking the hot- and cold-water inlet ports, whereby the axial position of the slide determines the ratio of hot and cold water fed from the inlet ports to the outlet port;
    a thermostat bearing axially on the slide and having a temperature-sensing part at the outlet;
    a temperature selector mounted on the housing and bearing axially on the thermostat;
    a partition sleeve centered on the axis in the valve slide and having ends fitting in the bore; and
    axially spaced annular hot-water and cold-water webs fixed to the partition sleeve and to the tubular valve slide, forming a mixing compartment opening into the sleeve, and having axially oppositely directed passages opening axially toward each other into the mixing compartment and axially oppositely toward the respective hot- and cold-water inlet ports, whereby water coming in through the inlet ports, passes through the respective passages into the mixing compartment, is mixed in the mixing compartment, flows from the mixing compartment into the sleeve, and flows axially in the sleeve over the part of the thermostat.

2. The mixing valve defined in claim 1 wherein the mixing compartment opens radially into the sleeve, the temperature-sensitive part of the thermostat being in the sleeve.

3. The mixing valve defined in claim 1 wherein the slide forms at each of the webs an annular inlet compartment, the inlets opening into the respective inlet compartments.

4. The mixing valve defined in claim 3 wherein the slide is formed with a pair of lips diverting water from the inlets into the respective inlet compartments.

5. The mixing valve defined in claim 1 wherein the passages extend axially.

6. The mixing valve defined in claim 5 wherein the passages of the hot-water web are angularly offset from the passages of the cold-water web.

7. The mixing valve defined in claim 5 wherein the passages of the hot-water web are axially aligned with the passages of the hot-water web.

8. The mixing valve defined in claim 1 wherein the temperature-sensing part of the thermostat is positioned in the sleeve adjacent the outlet port.

9. The mixing valve defined in claim 8 wherein the thermostat has a part whose dimension changes with temperature.

10. The mixing valve defined in claim 1 wherein the outlet port open axially and is axially centered.

11. The mixing valve defined in claim 1 wherein the sleeve is unitarily formed with one of the webs.

12. The mixing valve defined in claim 1 wherein the sleeve has a pair of tubular parts each formed with one of the webs, together forming the mixing compartment, and bearing axially on each other.

13. The mixing valve defined in claim 12 wherein the sleeve parts are joined together at the mixing compartment.

14. The mixing valve defined in claim 13 wherein the sleeve parts are releasably joined together.

15. The mixing valve defined in claim 1, further comprising
    seal rings between the sleeve and the bore.

\* \* \* \* \*

UNITED STATES PATENT AND TRADEMARK OFFICE
CERTIFICATE OF CORRECTION

PATENT NO. : 6,938,827 B2
DATED : September 6, 2005
INVENTOR(S) : Frank-Thomas Luig et al.

It is certified that error appears in the above-identified patent and that said Letters Patent is hereby corrected as shown below:

<u>Title page,</u>
Item [73], Assignee, should read -- Grohe Water Technology AG & Co. KG, Hemer (DE) --.

Signed and Sealed this

Twenty-seventh Day of December, 2005

JON W. DUDAS
*Director of the United States Patent and Trademark Office*